Jan. 1, 1963 E. A. GUTBIER 3,071,166

APPARATUS FOR ORIENTING COMPONENT LEADS

Filed Dec. 15, 1960 2 Sheets-Sheet 1

INVENTOR
E. A. GUTBIER
BY W. Johnson
ATTORNEY

Jan. 1, 1963 E. A. GUTBIER 3,071,166

APPARATUS FOR ORIENTING COMPONENT LEADS

Filed Dec. 15, 1960 2 Sheets-Sheet 2

INVENTOR
E. A. GUTBIER
By W. R. Johnson
ATTORNEY

United States Patent Office 3,071,166
Patented Jan. 1, 1963

3,071,166

APPARATUS FOR ORIENTING COMPONENT LEADS

Ernst A. Gutbier, Atkinson, N.H., assignor to Western Electric Company, Incorporated, a corporation of New York Filed Dec. 15, 1960, Ser. No. 76,032
2 Claims. (Cl. 140—1)

This invention relates to apparatus for orienting component leads, particularly wire leads of transistors.

In recent years, certain electrical components may be considered as miniatures in size as compared to similar components of former years comparing, for example, the transistors with the old type vacuum tubes. Formerly, the leads or terminals of components were rigid tubular structures which could be mounted in their respective bases in their predetermined relative positions and their rigid structures would assure their maintaining these relative positions. However, the smaller components require smaller leads or wire-like terminals which may become bent out of their desired relative positions during the processing of the components. This provides an additional problem of properly orienting the component leads to condition them for mounting in their units.

An object of the invention is an apparatus for efficiently orienting component leads.

A further object of the invention is an apparatus for retaining oriented leads in their predetermined relative positions.

In accordance with these objects, one of the features of the apparatus is the provision of straightening jaws operable relative to a holder for a component and having inter-fitting members for each lead of the component to orient their respective leads into predetermined parallel positions.

Another feature of the apparatus is the provision of a retaining element positioned in alignment with free ends of the oriented leads and associated with means to move the retaining element into engagement with the leads to hold them in their oriented positions.

Other objects and advantages will be apparent from the following detailed description when considered in conjunction with the accompanying drawings wherein.

Figures 1, 2, 3, 4:
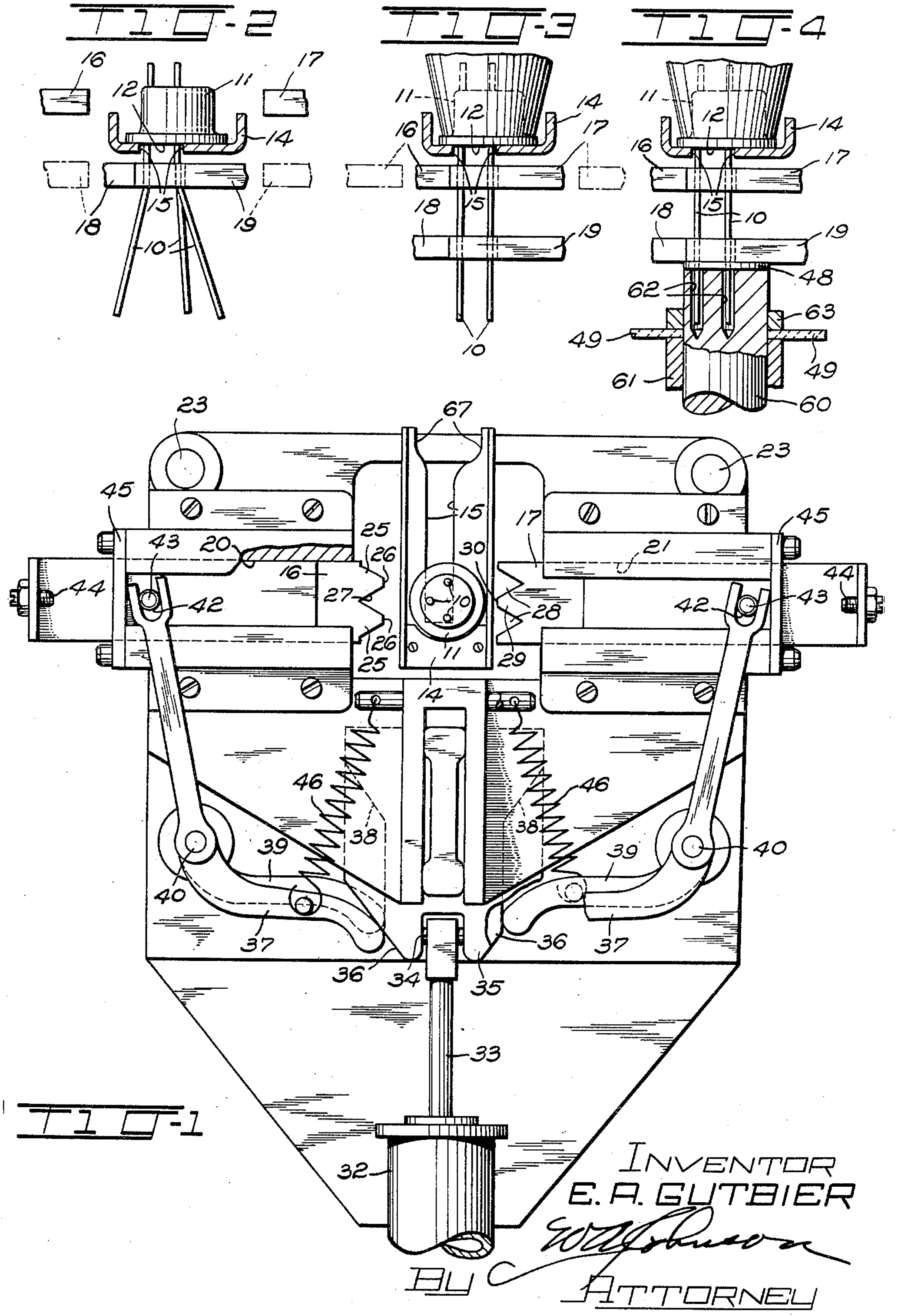
FIG. 1 is a top plan view of the apparatus.
FIG. 2 is a fragmentary portion of the apparatus illustrating the action of a set of straightening jaws.
FIG. 3 is a view of the structure shown in FIG. 2 with the addition of another set of straightening jaws.
FIG. 4 is a view of the structure shown in FIG. 3 with the addition of the means for forming and locating the retaining element on the leads.

In the present instance, the apparatus is designed to straighten and orient leads 10 of a component 11. The leads are mounted in the order illustrated in the plan views, shown particularly in FIGS. 1 and 6, with their upper ends fixed in these positions to a bottom portion 12 of the component. However, during handling of the components prior to their completion, the leads 10 may be bent, for example, as illustrated in FIG. 2, and it is necessary to orient these leads to bring them back into straight parallel positions for mounting in their units. To begin with, a holder 14 is provided for the successive components and has angular members with inner surfaces 15 as shown to support the component and locate the connection of fixed ends of the leads at predetermined positions in the apparatus.

Figure 6:
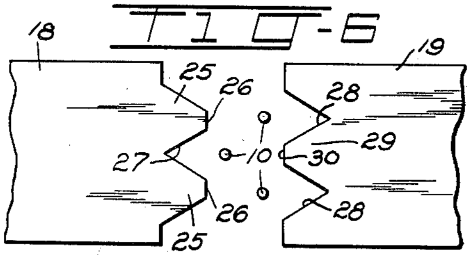
FIG. 6 is a fragmentary top plan view of one pair of the straightening jaws in open position.

The apparatus includes two sets or pairs of companion straightening jaws including first straightening jaws 16 and 17 and second straightening jaws 18 and 19. The jaws 16 and 18 are identical, as shown in FIGS. 1 and 6, and the jaws 17 and 19 are identical as also shown in these figures. The jaws are supported in their respective guideways 20 and 21 which are mounted on a carrier frame 22, the frame being mounted for vertical movement on rods 23, the lower ends of which are fixed in a base 24. The jaws 16 and 18 have V-shaped projections 25 with blunt ends 26 disposed upon each side of a V-shaped notch or recess 27. The jaws 17 and 19 have V-shaped notches 28 disposed upon each side of a V-shaped member 29 with a blunt end 30. With these contours of the companion jaws 16—17 and 18—19, it is possible to straighten or to orient the leads 10 into their predetermined desired locations with respect to their component 11.

The mechanisms for operating the first and second pairs of jaws are substantially identical and originate with a double acting air cylinder 32 having a piston rod 33 connected to a piston, not shown. The outer end of the piston rod 33 is connected at 34 to a double cam 35 having one set of cam surfaces 36 for cam levers 37 and another set of cams 38 for cam levers 39. The relative positions of the cam surfaces 36 and 38 through double actions of the air cylinder are to cause operation of the cam levers and their straightening jaws at different intervals. The cam levers 37 and 39 are identical, they being mounted on like pivots 40 and provided with bifurcated ends 42 to straddle pins 43 mounted on their respective jaws. The jaws have adjustable stop screws 44 positioned to engage members 45 to limit their endward movements and the levers 37 and 39 provided with springs 46 normally urging the levers into engagement with their portions of the cam 35.

Figure 8:
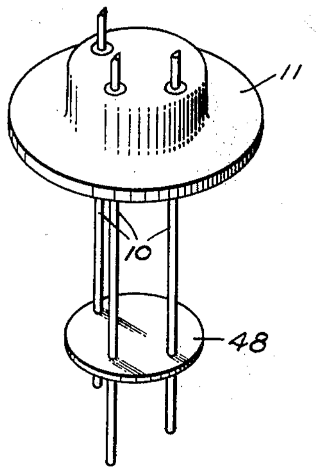
FIG. 8 is an isometric view of a component with straightened leads and the retaining element mounted thereon.

A retaining element or dielectric part 48, as shown in FIG. 8, is to be mounted on the free ends of the oriented leads to maintain the oriented positions of the leads until the component is mounted in its respective unit. The retaining element 48 is to be punched out of a strip of dielectric material 49 initially wound on a supply spool 50 which is supported for rotation on a spindle 51. The scrap material is wound on a spool 52 which is indexed intermittently by a pawl 53 and ratchet 54 mounted on a spindle 55, which is oscillated the distance of one tooth 56 of the ratchet for each cycle of a cam 57. The means for operating the pawl and ratchet is not shown in detail but may be considered to be of any conventional means for accomplishing this result.

The cam 57 is mounted on a cam shaft 58 and is operated through a complete cycle subsequent to a predetermined operation of the air cylinder 32. The mechanism for operating the cam shaft is not shown but may be any suitable means rendered effective subsequent to said operation of the air cylinder to drive the cam 57 through one complete cycle. A punch 60 is reciprocably disposed in a cylinder 61 mounted on the base 24 and is provided with apertures 62 in the upper portion thereof. The upper portion of the cylinder has an extension 63 mounted thereon and spaced from the upper end of the cylinder. The extension 63 in reality is a die for use in combination with the punch, particularly the circular edge of the upper surface 64 of the punch so that the disc-like retaining elements 48 may be punched from the strip 49.

Guides 65 and 66, mounted in the position shown, serve to guide the strip of material 49 toward and away from the punch and die. Furthermore, the apertures 62, which are three in number and disposed in the punch in alignment with their respective oriented leads 10, serve as dies when the retaining element, punched from the strip, is moved upwardly by the cam moving the punch 60 to the position shown in FIG. 4 so that the lower or free ends of the oriented leads will punch holes in the retaining element at the desired locations, resulting in the location of the retaining element on the leads where it will remain. The angle members of the holder 14 are cut away at 67 to allow removal of the component with the retaining element 48.

*Operation*

After each component 11 is located in the holder 14, the apparatus is set in operation. In one form of operation, the air cylinder 32 is operated to move the cam 35 causing closing of the first set of jaws 16 and 17 which are located near the holder to bring about partial orientation of the leads 10 and moving the leads into positions where it will be possible for the second set of jaws 18 and 19 to receive their respective portions of the leads and complete the straightening operation.

Figure 7:
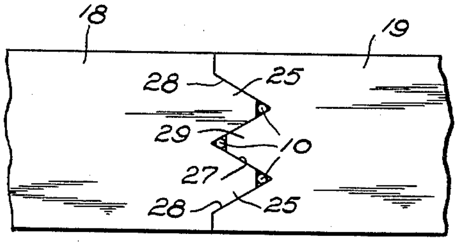
FIG. 7 is a fragmentary top plan view of the jaws shown in FIG. 6 in closed position.

In each set of jaws, there is a special pocket for each lead, these pockets being the V-shaped recesses 27 and 28 and closing means for the pockets constituting the V-shaped projections 25 and 29 with their blunt ends 26 and 30 providing spaces for the leads, as shown particularly in FIG. 7, where the leads have been moved to definite locations not only adjacent the bottom surface 12 of the component, but near the free ends of the leads, to assure complete and accurate orientation of the leads.

The leads are held in the oriented positions, after the operation of the straightening jaws and while the cam 57 is operated to cause the punch 60 with the die 63 to punch a retaining element 48 out of the strip of dielectric material 49 and to move this element upwardly until the free ends of the leads punch holes in it while entering the dielectric material and the apertures 62.

Figure 5:
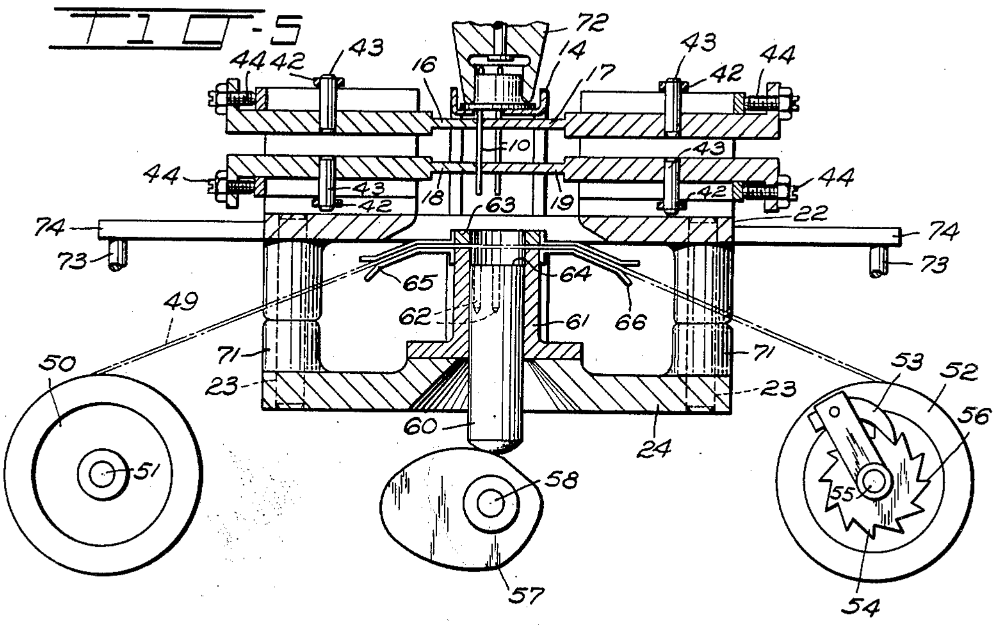
FIG. 5 is a vertical sectional view of the apparatus with the straightening jaws closed and the means for forming and locating the retaining element in the unoperated position.

The second portion of the operating cycle is in reverse order in that the cam 57 completes its cycle without hesitation, returning to the normal position shown in FIG. 5, after which the air cylinder is given a reverse action returning the cam 35 to its normal position and allowing the jaws to be opened for removal of the component with its oriented leads and retaining element and for the insertion of another component.

By mounting the carriage 22 for vertical movement on guide rods 23 with their lower ends fixed in apertured members 71 of the base 24, the carriage may be moved between the down position shown in FIG. 5 and an up position where the lower jaws 18 and 19 will be in the positions of the upper jaws 16 and 17 now shown in this figure. The holder 14 is mounted at a fixed position on the base 24 so that a transfer member 72, holding the component, may move the component 11 onto the holder 14 with the leads extending between the angle members. The means for moving the carriage 22 between its up and down positions includes, in the present instance, air cylinders (not shown), the piston rods 73 of which are connected to projections 74 of the carriage. If desired, a single air cylinder or similar structure may be mounted on the base 24 beneath the carriage and connected thereto. This action permits reversing the actions of the jaws by reversing the position of the cam 35 so that the lower jaws 18 and 19 may be operated closed when in their up positions to engage the leads 10 near their fixed ends and perform a straightening or orienting action while the lower closed jaws are moved to their down positions. After this action of the lower jaws, the upper jaws 16 and 17 are closed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for orienting component leads into parallel positions relative to each other, fixed ends of each group of leads extending from each component at known spaced positions, comprising:
 - a holder for supporting components singly and locating the fixed ends of the group of leads thereof in predetermined fixed positions,
 - normally open companion orienting jaws having interfitting members for the individual leads of each group spaced relative to each other and adapted when closed to orient their respective leads into predetermined parallel positions,
 - a support for the jaws adapting them for movement relative to each other,
 - means to move the jaws into closed positions and hold the jaws closed for a predetermined time interval,
 - a reciprocable punch supported for alignment with the group of oriented leads,
 - means to locate a strip of dielectric material between the reciprocable punch and the free ends of the oriented leads, and
 - means to reciprocate the punch to cause it to punch a part from the material and mount it on the free ends of the group of leads while the leads are held by the orienting jaws to thereby hold the leads oriented after they are released by the orienting jaws.

2. An apparatus for orienting component leads according to claim 1 in which:
 - a die for the punch is mounted at a fixed position between the punch and the oriented leads to cooperate with the punch in punching the member from the strip, and
 - a die portion for each lead disposed in the punch and aligned with its oriented lead so that the member punched from the strip when moved past the free ends of the oriented leads will cause said free ends of the leads to punch holes in the member and enter their die portions.

References Cited in the file of this patent

UNITED STATES PATENTS

| | | |
|---|---|---|
| 1,760,629 | Brindle | May 27, 1930 |
| 2,120,877 | Uber | June 14, 1938 |
| 2,644,998 | Klinkert et al. | July 14, 1953 |
| 2,808,636 | Vargo et al. | Oct. 8, 1957 |